(No. Model.)
S. PORTER & L. A. CARPENTER.
REPAIR TOOL FOR BICYCLE TIRES.
No. 576,690. Patented Feb. 9, 1897.
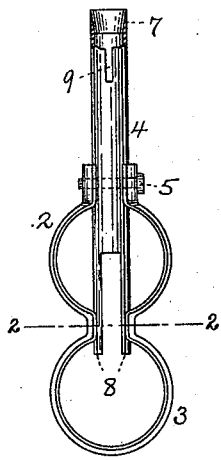
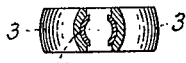
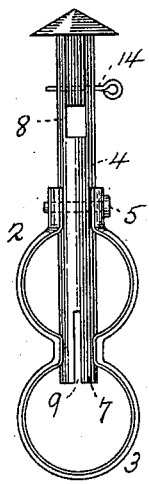
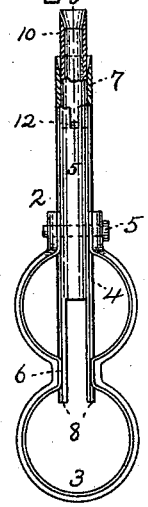
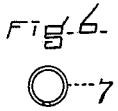
WITNESSES
INVENTORS
Stephen Porter.
Lewis A. Carpenter.
by H. E. Lodge Atty.

UNITED STATES PATENT OFFICE.

STEPHEN PORTER, OF BOSTON, AND LEWIS A. CARPENTER, OF REVERE, MASSACHUSETTS.

REPAIR-TOOL FOR BICYCLE-TIRES.

SPECIFICATION forming part of Letters Patent No. 576,690, dated February 9, 1897.

Application filed June 6, 1896. Serial No. 594,525. (No model.)

*To all whom it may concern:*

Be it known that we, STEPHEN PORTER, residing at Boston, and LEWIS A. CARPENTER, residing at Revere, in the county of Suffolk and State of Massachusetts, citizens of the United States, have invented certain new and useful Improvements in Repair-Tools for Bicycle-Tires; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to tools or devices for repairing bicycle-tires, particularly punctured ones of the pneumatic class.

In the repair of a punctured tire practice has shown that in order to secure an air-tight closure of the puncture with a plug it is necessary that the aperture produced by the tack, glass, or other obstacle encountered and the cause of the damage should be made circular before the plug is inserted.

Our invention is embodied in a device which comprises a tool for producing a circular hole, likewise in an element for inserting the plug, and, further, in means for holding the plug after it has been inserted in the tire and during the act of repairing in order to prevent its being lost in the bore of the tire, which frequently happens.

One of the prominent features of our invention consists in providing a cutting-tool of such a form that no anvil is required and the hole can be cut by a semirotary movement of the tool. In this way the hole can be trimmed and the wall of the tire pierced without danger of injuring the opposite wall of the uninjured part of the tube.

The drawings accompanying this specification represent, in Figure 1, a side elevation of a repair-tool with the tool-stock positioned with the cutting-tool in the front end and embodying our invention. Fig. 2 is a cross-section on line 2 2, showing the interlocking of the tool-stock with the handle. Fig. 3 is a side elevation of a repair-tool in which the tool-stock is reversed in position from that in Fig. 1. Fig. 4 is a sectional view of the repair-tool with a secondary cutting-tool. Fig. 5 is a part section on line 5 5 in Fig. 4. Fig. 6 is an end view of the cutting-tool.

In said drawings, 2 represents a repair-tool, composed of a handle of any desirable shape 3 and a tool-stock 4. This latter element is pivotally secured to the handle at 5 and is adapted to rotate lengthwise of the tool and to be held firmly locked in two extremes of positions, for purposes hereinafter described. In the present instance this locking of the tool-stock is produced by the spring action of the handle, the opposite side portions of which are bent inwardly and recessed or made concave upon their inner surfaces at 6 in order to seize and grasp the tool-stock in one of two extremes of position, as said tool-stock is reversible. This element 4 is preferably a cylindrical rod, which at one end is bored out in order to produce a circular cutting-tool 7, while the opposite end is bifurcated or equipped with two spring-fingers 8, which are adapted to grasp the plug. These fingers are to be of soft metal of sufficient stiffness to perform their duties and yet allow them to be spread apart or contracted that they may grasp different sizes of plugs with equal facility.

For similar reasons that end of the tool-stock provided with a cutting-tool is formed with a longitudinal slit or aperture 9 in order to receive a secondary tool 10. This instrumentality consists of a short hollow metallic tube reduced to a cutting edge at one end, while the opposite or rear extremity is equipped with a boss or shoulder 12 of a size to fit and slide in the slot. Thus if a smaller hole is to be made the secondary cutting-tool is introduced within the bore of the cutter 7, the boss 12 to be engaged in the slot, and then the secondary cutter is pushed in until the boss reaches the end of the slot. The repair-tool is then in readiness to be operated with the smaller cutter.

The bifurcated extremity of the tool-stock is transversely bored to receive a pin 14, adapted to pierce the plug and hold the latter until the operator has ascertained that it is suited for the position it is to occupy and likewise to prevent the plug from slipping through the hole and being lost in the bore of the tire.

Hence it is evident that if the cement is not sufficient or the plug does not fit—in other words, if the closure of the puncture is not a success and the air still escapes—the plug can readily be withdrawn and the difficulty may be remedied. This is an important feature, and obvious advantages are derived therefrom. Furthermore, this fastening-pin enables the plug to be twisted or turned in the hole in order to distribute the cement about the inner surface of the tube-wall near the puncture.

The method of procedure in the use of a repair-tool embodying our invention to the successful closure of a punctured pneumatic tire is as follows: The point of leakage being located and the size being ascertained, the operator determines which gage of cutting-tool he will employ, large or small. He then positions the tool-stock in the handle, as shown in Fig. 1 of the drawings, with the cutting-tool at its front extremity and proceeds to semirotate the tool, at the same time pressing it against the material composing the tire. By this semicircular or drilling motion the walls of the tire are easily and readily pierced, and this without the aid of an anvil, as is required provided a punch were employed, since in the use of a tool of the latter description unless an anvil is used there is great danger of injuring the opposite imperforate wall of the tire. When the hole is properly cut, the tool-stock is reversed, when it appears as in Fig. 3. The bifurcated end is now the front end of the tool. Between the fingers 8 is now thrust the plug, the ordinary mushroom type, the stem being clasped by the fingers. When in this position, the pin 14 is thrust through the holes in said fingers, and, passing directly through the shank or stem of the plug, secures the latter firmly to the tool-stock.

The operator having previously coated the hole and the adjacent interior wall-surface of the tire with some suitable cement thrusts the head of the plug forcibly through the opening where the puncture exists. After the plug has passed clear through the wall of the tire the tool is pulled back until the head of the plug is forcibly pressed against the interior surface of the tire. The tire is then inflated. Should air escape, the plug may be withdrawn and more cement applied or another plug substituted. When the closure is a success, the retaining-pin 14 is pulled out, the fingers released from the stem of the plug, and the tool is then removed or drawn out from the tire. The cement on the walls of the hole now adheres to the stem of the plug, the projecting extremity of the stem is trimmed off, and the repairs are finished.

This tool is very simple, inexpensive, and enables the possessor to rapidly close a puncture, and this without burning or punching, two undesirable methods, since it is found that a puncture cannot successfully be repaired by means of a plug without previously trimming the aperture and producing a circular opening for the admission of said plug.

What we claim is—

1. A repair-tool for pneumatic tires comprising a handle, a reversibly-swinging tool-stock secured to said handle, and a circular cutting-tool at one end of said tool-stock, said tool to be operated by successive semirotary movements without a coöperating anvil.

2. A repair-tool consisting of a handle, a swinging tool-stock, a circular cutting-tool at one extremity of said tool-stock, holding-fingers at the opposite end, and means for securing the tool-stock rigidly, whereby either end of the tool-stock may be actively employed.

3. A repair-tool comprising a handle, a reversible tool-stock, a circular cutting-tool and holding-fingers at opposite ends of the tool-stock, and a retaining-pin transversely through the fingers, substantially as stated.

4. In a repair-tool the combination with a handle, and a swinging tool-stock adapted to be held locked by said handle in two extremes of position and formed with a cutting end and a bifurcated end at its opposite extremities, of a removable circular cutting-tool provided with a lug to engage a slot in the tool-stock, holding-fingers likewise on said tool-stock, and a holding-pin transversely of said fingers, substantially as set forth and described.

In testimony whereof we affix our signatures in presence of two witnesses.

STEPHEN PORTER.
LEWIS A. CARPENTER.

Witnesses:
H. E. LODGE,
FRANCIS C. STANWOOD.